US009100898B2

(12) United States Patent
Bonneville et al.

(10) Patent No.: US 9,100,898 B2
(45) Date of Patent: Aug. 4, 2015

(54) METHOD AND A DEVICE FOR ENABLING A MOBILE TERMINAL TO ACCESS TO A WIRELESS CELLULAR TELECOMMUNICATION NETWORK

(75) Inventors: Herve Bonneville, Rennes Cedex (FR);
Loic Brunel, Rennes Cedex (FR);
Nicolas Gresset, Rennes Cedex (FR);
Mourad Khanfouci, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 393 days.

(21) Appl. No.: 13/122,471

(22) PCT Filed: Oct. 22, 2009

(86) PCT No.: PCT/EP2009/063912
§ 371 (c)(1),
(2), (4) Date: Apr. 4, 2011

(87) PCT Pub. No.: WO2010/046444
PCT Pub. Date: Apr. 29, 2010

(65) Prior Publication Data
US 2011/0189992 A1 Aug. 4, 2011

(30) Foreign Application Priority Data
Oct. 24, 2008 (EP) ..................... 08167487

(51) Int. Cl.
*H04B 7/00* (2006.01)
*H04W 48/12* (2009.01)
(Continued)

(52) U.S. Cl.
CPC ............... *H04W 48/12* (2013.01); *H04W 8/18* (2013.01); *H04W 12/08* (2013.01);
(Continued)

(58) Field of Classification Search
CPC .......... H04W 84/045; H04W 36/0055; H04W 36/0061; H04W 36/0083; H04W 36/08; H04W 36/04; H04W 48/20; H04W 92/20
USPC ........ 455/421, 422.1, 423, 432.1, 435.1, 434, 455/445, 446, 447, 448, 449, 450, 451, 455/452.1, 524, 525, 435.2, 436–444; 370/252, 338, 401, 431, 328–331
See application file for complete search history.

(56) References Cited

U.S. PATENT DOCUMENTS 7,610,054 B2 * 10/2009 Hosokawa ..................... 455/461
7,929,964 B2 * 4/2011 Arumi et al. ................ 455/426.1
(Continued)

OTHER PUBLICATIONS
3GPP TSG-SA1 #41, SI-082091, "TS22.220 Open Home Node B and Home eNode B," Qualcomm, Telecom Italia, total 1 page, (Jul. 21-25, 2008) XP 050228604.
(Continued)

*Primary Examiner* — Olumide T Ajibade Akonai
(74) *Attorney, Agent, or Firm* — Oblon, McClelland, Maier & Neustadt, L.L.P.

(57) ABSTRACT

A method enabling a mobile terminal to access a wireless cellular telecommunication network including plural base stations and a core network device. The mobile terminal is allowed to access the wireless cellular telecommunication network through at least one first base station and memorizes a list including information enabling the identification of signals transferred by each first base station, the mobile terminal not memorizing information enabling the identification of signals transferred by second base stations. One second base station: receives a message requesting the second base station to transfer signals that should be transferred by one first base station, transfers signals that should be transferred by the first base station, and broadcasts information enabling the identification by the mobile terminal of other signals transferred by the second base station and/or at least one other second base station.

15 Claims, 5 Drawing Sheets (51) Int. Cl.
| | |
|---|---|
| H04W 36/00 | (2009.01) |
| H04W 36/04 | (2009.01) |
| H04W 8/18 | (2009.01) |
| H04W 12/08 | (2009.01) |
| H04W 48/16 | (2009.01) |
| H04W 84/04 | (2009.01) |

(52) U.S. Cl.
CPC ...... *H04W 36/0061* (2013.01); *H04W 36/0083* (2013.01); *H04W 36/04* (2013.01); *H04W 48/16* (2013.01); *H04W 84/045* (2013.01)

(56) References Cited

U.S. PATENT DOCUMENTS

| | | | | |
|---|---|---|---|---|
| 8,072,953 | B2* | 12/2011 | Mukherjee et al. | 370/338 |
| 8,243,682 | B2* | 8/2012 | Nylander et al. | 370/331 |
| 8,310,946 | B2* | 11/2012 | Somasundaram et al. | 370/252 |
| 2007/0004427 | A1* | 1/2007 | Morgan et al. | 455/456.1 |
| 2007/0190996 | A1 | 8/2007 | Asthana et al. | |
| 2008/0220782 | A1* | 9/2008 | Wang et al. | 455/436 |
| 2009/0168727 | A1* | 7/2009 | Somasundaram et al. | 370/332 |
| 2010/0075670 | A1* | 3/2010 | Wu | 455/434 |

OTHER PUBLICATIONS

3GPP TS 22.220 V.O.3.0, "3rd Generation Partnership Project; Technical Specification Group Services and System Aspects; Service requirements for Home NodeBs and Home eNodeBs; (Release 9)," 3GPP™, pp. 2-14, (Jul. 2008) XP 050228828.

3GPP TSG-SA WG1 Meeting #39, SI-080087, "HNB / HeNB CSG—Draft requirements list and comments—version 0010," VODAFINE, total 8 pages, (Jan. 28-Feb. 1, 2008) XP 050228004.

International Search Report issued Jan. 20, 2010 in PCT/EP09/063912 filed Oct. 22, 2009.

* cited by examiner

METHOD AND A DEVICE FOR ENABLING A MOBILE TERMINAL TO ACCESS TO A WIRELESS CELLULAR TELECOMMUNICATION NETWORK

The present invention relates generally to a method and a device for enabling a mobile terminal to access to a wireless cellular telecommunication network comprising plural base stations.

Wireless cellular telecommunication networks are largely deployed but there are still some areas not covered by the base stations of the wireless cellular telecommunication network.

For example, the access to the wireless cellular telecommunication network might not be possible for a mobile terminal located in a building, if the signals radiated by the base stations are too attenuated.

Solutions are proposed today. Particular base stations, like home base stations or femto base stations provide coverage areas within the buildings.

These home base stations enable a limited number of mobile terminals to access the wireless cellular telecommunication network through their respective resources in order to maintain the quality of service offered by the home base stations to their mobile terminals or to provide the desired service to their mobile terminals or both. The mobile terminals allowed to access the resources of the network through the home base station may be determined by the owner of the home base station, the network or a combination of both.

The owner must be understood here in the general sense: the owner may only be the main user of the home base station, the owner may be the person who rents the home base station or the owner may be the person who accommodates the home base station in his house or office.

For example, only mobile terminals of the owner of the home base station and its family can access to the wireless cellular telecommunication network through the home base station. These mobile terminals are associated with the home base station. Other mobile terminals cannot access to the wireless cellular telecommunication network through the home base station. The other mobile terminals are not associated with the home base station.

When a home base station is not operational, for example when the home base station is powered off, broken, or disconnected from the telecommunication network, the mobile terminal which is associated with the home base station cannot access the wireless cellular telecommunication network through another home base station if the mobile terminal is not allowed to access the wireless cellular telecommunication network through this other home base station. This situation may result in the impossibility for the mobile terminal to access the wireless cellular telecommunication network. For instance, it happens when the mobile terminal is only surrounded by home base stations, which it is not associated with and it is not under the coverage of macro base stations, which give open access to all mobile terminals. The latter macro base stations are, for instance, base stations of a regular macro-cellular deployment.

If the mobile terminal attempts to access the wireless cellular telecommunication network through the other home base station, the wireless cellular telecommunication network rejects the mobile terminal as there is no association between the mobile terminal and the other home base station.

The present invention aims at allowing a mobile terminal, which is associated with a base station like a home base station, to be aware of at least another base station which the mobile terminal is not associated with. Furthermore, the present invention enables the mobile terminal, being aware of the other base station to get access to the wireless cellular telecommunication network even if the base station it is associated with is not operational.

To that end, the present invention concerns a method for enabling a mobile terminal to access a wireless cellular telecommunication network comprising plural base stations and a core network device, the mobile terminal being allowed to access the wireless cellular telecommunication network through at least one first base station, the mobile terminal memorizing a list comprising information enabling the identification of signals transferred by each first base station, the mobile terminal not memorizing information enabling the identification of signals transferred by second base stations, characterised in that the method comprises the steps, executed by one second base station, of:

receiving, from the core network device, a message requesting the second base station to transfer signals that should be transferred by one first base station, transferring signals that should be transferred by the first base station, broadcasting, in a broadcasting channel, information enabling the identification by the mobile terminal of other signals transferred by the second base station and/or at least one other second base station, the other signals being different from signals that should be transferred by the first base station.

The present invention concerns also a device for enabling a mobile terminal to access a wireless cellular telecommunication network comprising plural base stations and a core network device, the mobile terminal being allowed to access the wireless cellular telecommunication network through at least one first base station, the mobile terminal memorizing a list comprising information enabling the identification of signals transferred by each first base station, the mobile terminal not memorizing information enabling the identification of signals transferred by second base stations, characterised in that the device for enabling a mobile terminal to access a wireless cellular telecommunication network is included in the second base station and comprises:

means for receiving, from the core network device, a message requesting the second base station to transfer signals that should be transferred by one first base station, means for transferring signals that should be transferred by the first base station, means for broadcasting, in a broadcasting channel, information enabling the identification by the mobile terminal of other signals transferred by the second base station and/or at least one other second base station, the other signals being different from signals that should be transferred by the first base station.

Thus, the mobile terminal being aware of at least another base station with which the mobile terminal is not associated with, is able to access the wireless cellular telecommunication network, through a second base station it is not associated with. Furthermore, the mobile terminal is able to directly identify the right second base station it has to connect to.

According to a particular feature, the core network device:

determines if one first base station that should transfer signals to the mobile terminal is not operational, transfers a message requesting the second base station to transfer signals that should be transferred by one of the first base stations of which information enabling the identification of signals transferred by the first base station is comprised in the list if the first base station that should transfer signals to the mobile terminal is not operational, allows the mobile terminal to access the wireless cellular telecommunication network through the second base station which transfers signals that should be transferred by one of the first base stations of which information enabling the identification of signals transferred by the first base station is comprised in the list.

Thus, the present invention enables the mobile terminal, being aware of the second base station, to get access to the wireless cellular telecommunication network even if the first base station is not operational.

According to a particular feature, information enabling the identification by the mobile terminal of other signals transferred by at least one other second base station are received from the core network device or memorized by the second base station.

Thus, the second base station is able to broadcast these other signals, enabling the mobile terminal to choose between different second base stations it is not associated with and it is now allowed to connect to. This choice of the second base station the terminal will try to connect to may be done according to received power at the mobile terminal from each second base station or the signal-to-interference-plus-noise ratio with each second base station at the mobile terminal or the path loss between the mobile terminal and each second base station. An appropriate choice will reduce the amount of interference in the system, will reduce the battery consumption of the mobile terminal and will improve the data throughput between the mobile terminal and the second base station.

According to a particular feature, the signals that should be transferred by one of the first base stations are the signals that should be transferred by the first base station which is not operational.

Thus, the choice of the signals is straightforward and the mobile terminal or each mobile terminal when plural mobile terminal are associated with the first base station which is not operational is able to identify the signals.

Otherwise, if the signals are signals transferred by one first base station which is different from the base station which is not operational, the core network device has to make sure that the mobile terminal or each mobile terminal associated with the first base station which is not operational is also associated with the first base station which is different from the base station which is not operational.

According to a particular feature, the signals that should be transferred by one of the first base stations are the signals that should be transferred by one first base station which is different from the base station which is not operational.

Thus, if the first base station becomes operational, there is no problem of interference between the signals transferred by the second base station and the signals transferred by the first base station when it is operational again.

The present invention concerns also a method for enabling a mobile terminal to access a wireless cellular telecommunication network comprising plural base stations and a core network device, the mobile terminal being allowed to access the wireless cellular telecommunication network through at least one first base station, the mobile terminal memorizing a list comprising information enabling the identification of signals transferred by each first base station, the mobile terminal not memorizing information enabling the identification of signals transferred by second base stations, characterised in that the method comprises the steps, executed by the mobile terminal, of:

receiving signals identifying one first base station, checking if information enabling the identification by the mobile terminal of other signals is received in a broadcasting channel, the other signals being transferred by one second base station, the other signals being different from signals identifying one first base station, transferring a message to one second base station if information enabling the identification by the mobile terminal of other signals is received in the broadcasting channel, the message requesting to access the wireless cellular telecommunication network through the second base station.

The present invention concerns also a device for enabling a mobile terminal to access a wireless cellular telecommunication network comprising plural base stations and a core network device, the mobile terminal being allowed to access to the wireless cellular telecommunication network through at least one first base station, the mobile terminal memorizing a list comprising information enabling the identification of signals transferred by each first base station, the mobile terminal not memorizing information enabling the identification of signals transferred by second base stations, characterised in that the device for enabling a mobile terminal to access a wireless cellular telecommunication network is included in the mobile terminal and comprises:

means for receiving signals identifying one first base station, means for checking if information enabling the identification by the mobile terminal of other signals is received in a broadcasting channel, the other signals being different from signals identifying one first base station, means for transferring a message to one second base station if information enabling the identification by the mobile terminal of other signals are received in the broadcasting channel, the message requesting to access the wireless cellular telecommunication network through the second base station.

Thus, the mobile terminal can get access to the wireless cellular telecommunication network even if the base station it is associated with is not operational.

According to a particular feature, the information enabling the identification by the mobile terminal of other signals is transferred by the second base station to which the message is transferred.

Thus, the time and frequency synchronisation of the mobile terminal with the second base station to which the message is transferred is already achieved since the mobile terminal has already received signals identifying one first base station which are actually transferred by the second base station to which the message is transferred. Indeed, we may assume that the second base station transfers signals identifying one first base station and other signals in a synchronous manner.

Furthermore, the data throughput obtained by the mobile terminal when connecting with the second base station to which the message is transferred will be good since a good choice of a second base station transferring the signals identifying one first base station is a second base station which has a coverage zone which is close to the coverage zone of the first base station.

According to a particular feature, the information enabling the identification by the mobile terminal of other signals is transferred by another second base station which is different from the second base station to which the message is transferred.

Thus, the information enabling the identification by the mobile terminal of other signals may enable the identification of other signals transferred by several second base stations. This largest choice of base stations enables an appropriate choice at the mobile terminal side depending on the mobile terminal position with respect to the different second base stations. It results in better data throughput. Furthermore, when the mobile terminal moves, it can perform handover to another second base station identified in the information.

According to a particular feature, the mobile terminal memorizes information enabling the identification by the mobile terminal of other signals.

Thus, this information does not have to be re-obtained by receiving signals identifying one first base station, each time the mobile terminal has to access the wireless cellular telecommunication network. The mobile terminal can directly receive the other signals and transfer a message to the second base station.

According to a particular feature, information enabling the identification by the mobile terminal of other signals are memorized for a limited period of time.

Thus, this information is automatically released after a certain amount of time and the mobile terminal cannot access the wireless cellular telecommunication network through the second base station for ever, which could result in having too many mobile terminals communicating with the second base station.

According to a particular feature, prior to transferring a message to one second base station, the mobile terminal receives other signals identifying one second base station.

Thus, the mobile terminal obtains the whole information, which is necessary to communicate with a second base station before transferring a message to this second base station. By doing this, the mobile terminal makes sure that the message is properly formatted to be received by the second base station and that the mobile terminal can properly receive a message from this second base station.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatus according to the invention, they will not be repeated here.

The characteristics of the invention will emerge more clearly from a reading of the following description of an example embodiment, the said description being produced with reference to the accompanying drawings, among which.

Figure 1:
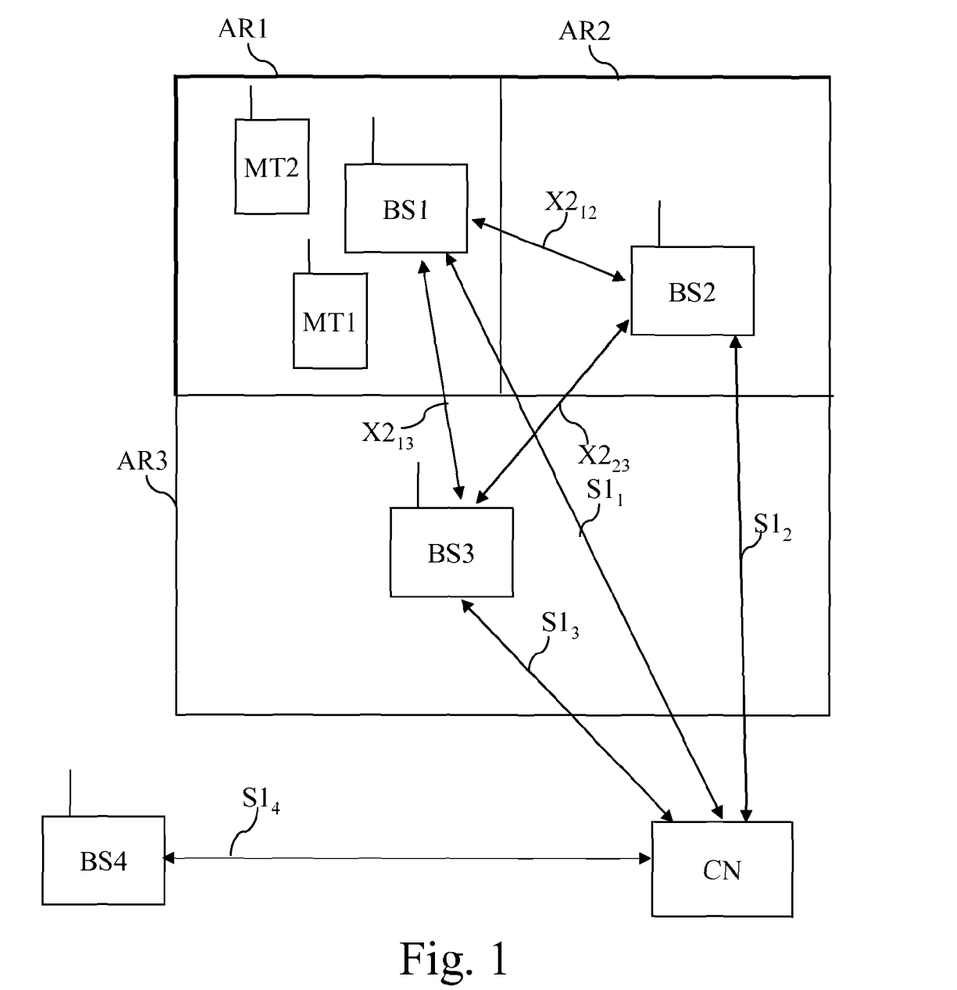
FIG. 1 represents a wireless cellular telecommunication network in which the present invention is implemented.

In FIG. 1, four base stations BS1, BS2, BS3 and BS4 of a wireless cellular telecommunication network and two mobile terminals MT1 and MT2 are shown.

The base stations BS are for example home base stations BS like femto base stations or pico base stations. The base stations BS are for example located into homes and may enable mobile terminals MT to access the wireless cellular telecommunication network.

Two mobile terminals MT1 and MT2 are shown in FIG. 1. Each mobile terminal MT memorises a list, named white list, which identifies each base station BS through which the mobile terminal MT is allowed to access the wireless cellular telecommunication network.

For example, the white list of the mobile terminal MT1 identifies the base stations BS1 and BS4 and the white list of the mobile terminal MT2 identifies the base station BS1.

For example, a base station BS is identified in a white list of a mobile terminal MT when the base station BS belongs to the owner of the mobile terminal MT or when the base station BS belongs to the family or friends of the owner of the mobile terminal MT.

When a base station BS is identified in the white list of a mobile terminal MT, the mobile terminal MT can recognize signals transferred by the base station BS.

When a base station BS is not identified in the white list of a mobile terminal MT, the mobile terminal MT can not recognize signals transferred by the base station BS or does not consider them.

The base station BS1 is located in the area AR1, the base station BS2 is located in the area AR2 and is not identified in the white list of the mobile terminals MT1 and MT2, the base station BS3 is located in the area AR3 and is not identified in the white list of the mobile terminals MT1 and MT2.

When the base station BS1 is operational, the signals transferred by the base station BS1 are received by any mobile terminal MT located in the area AR1 or AR2. When the base station BS2 is operational, the signals transferred by the base station BS2 are received by any mobile terminal MT located in the area AR1 or AR2. When the base station BS3 is operational, the signals transferred by the base station BS3 are received by any mobile terminal MT located in the area AR1 or AR3. When the base station BS4 is operational, the signals transferred by the base station BS4 are not received by any mobile terminal MT located in the area AR1, AR2 or AR3.

The mobile terminals MT1 and MT2 located in the area AR1 can then receive the signals transferred by the base stations BS1, BS2 and BS3 when the base stations BS are operational.

The areas AR1, AR2 and AR3 are for example apartments in a building.

Each base station BS1, BS2, BS3 and BS4 is connected to a core network device CN of the wireless cellular telecommunication network through a telecommunication network not shown in FIG. 1.

The base station BS1 is linked to the core network device CN through the link $S1_1$ established on the telecommunication network.

The base station BS2 is linked to the core network device CN through the link $S1_2$ established on the telecommunication network.

The base station BS3 is linked to the core network device CN through the link $S1_3$ established on the telecommunication network.

The base station BS4 is linked to the core network device CN through the link $S1_4$ established on the telecommunication network.

The base station BS1 may be linked to the base station BS2 through the link $X2_{12}$ established on the telecommunication network.

The base station BS1 may be linked to the base station BS3 through the link $X2_{13}$ established on the telecommunication network.

The base station BS2 may be linked to the base station BS3 through the link $X2_{23}$ established on the telecommunication network.

The base stations BS1, BS2, BS3 may be linked to the base station BS4 through a respective link not shown in FIG. 1 established on the telecommunication network.

When the base station BS1 is not operational, for example when the base station BS1 is powered off, broken, is in an operating mode wherein the base station BS1 does not transfer signals identifying the base station BS1, or disconnected from the telecommunication network, the mobile terminal MT1, located in the area AR1, cannot access the wireless cellular telecommunication network through another base station BS2, BS3 or BS4. The base stations BS2 and BS3 are not identified in the white list of the mobile terminal MT1 and the mobile terminal MT1 is too far from the base station BS4. The mobile terminal MT2, located in the area AR1, cannot access the wireless cellular telecommunication network through another base station BS2, BS3 or BS4. The base stations BS2, BS3 and BS4 are not identified in the white list of the mobile terminal MT2.

When a mobile terminal MT accesses the wireless cellular telecommunication network, the mobile terminal MT can establish or receive a communication with a remote telecommunication device and/or can download data.

Information identifying a base station BS may identify uniquely the base station BS among all the base stations BS of the wireless cellular telecommunication network or may identify uniquely the base station BS among a limited number of base stations BS of the wireless cellular telecommunication network, for example the base stations BS located within a given area.

The information identifying a base station BS enables the mobile terminal MT to recognize signals transferred by the base station BS. The information identifying a base station BS may also be, for example, reference signals used for channel estimation between the base station BS and the mobile terminal MT.

When a base station BS is not identified in the white list of a mobile terminal MT, the mobile terminal MT can not or does not detect the signals transferred by that base station BS.

According to the invention, the core network device CN detects when a base station BS, located in the vicinity of a mobile terminal MT and identified in the white list of the mobile terminal MT, is not operational.

In that case, the core network device CN requests a base station BS that is not identified in the white list of the mobile terminal MT to transfer signals that should be transferred by one base station BS identified in the white list of the mobile terminal MT.

According to the invention, at least one base station BS not identified in the white list of a mobile terminal MT:

receives, from the core network device, a message requesting the base station BS not identified in the white list of the mobile terminal MT to transfer signals that should be transferred by one base station identified in the white list of the mobile terminal MT, transfers signals that should be transferred by the base station BS identified in the white list of the mobile terminal MT, broadcasts, in a broadcasting channel, information enabling the identification by the mobile terminal MT of other signals transferred by the base station BS not identified in the white list of the mobile terminal MT and/or at least one other base station BS not identified in the white list of the mobile terminal MT, the other signals being different from signals that should be transferred by the base station BS identified in the white list of the mobile terminal MT.

A broadcasting channel is a channel which is common to all mobile terminals MT or to at least two mobile terminals MT for receiving signals from a base station BS.

Broadcasting is understood as a transmission to at least two mobile terminals MT which are known or not by the base station BS.

According to the invention, the mobile terminal MT:

receives signals identifying one base station BS identified in the white list of the mobile terminal MT, checks if information enabling the identification by the mobile terminal MT of other signals is received in a broadcasting channel, the other signals being transferred by one base station BS not identified in the white list of the mobile terminal MT, the other signals being different from signals identifying one base station BS identified in the white list of the mobile terminal MT, transfers a message to the base station BS not identified in the white list of the mobile terminal MT if information enabling the identification by the mobile terminal MT of other signals is received in the broadcasting channel, the message requesting to access the wireless cellular telecommunication network through the base station BS.

Figure 2:
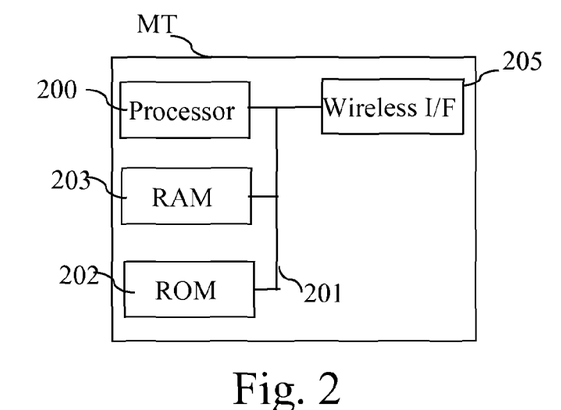
FIG. 2 is a diagram representing the architecture of a mobile terminal in which the present invention is implemented.

FIG. 2 is a diagram representing the architecture of a mobile terminal in which the present invention is implemented.

Figure 6:
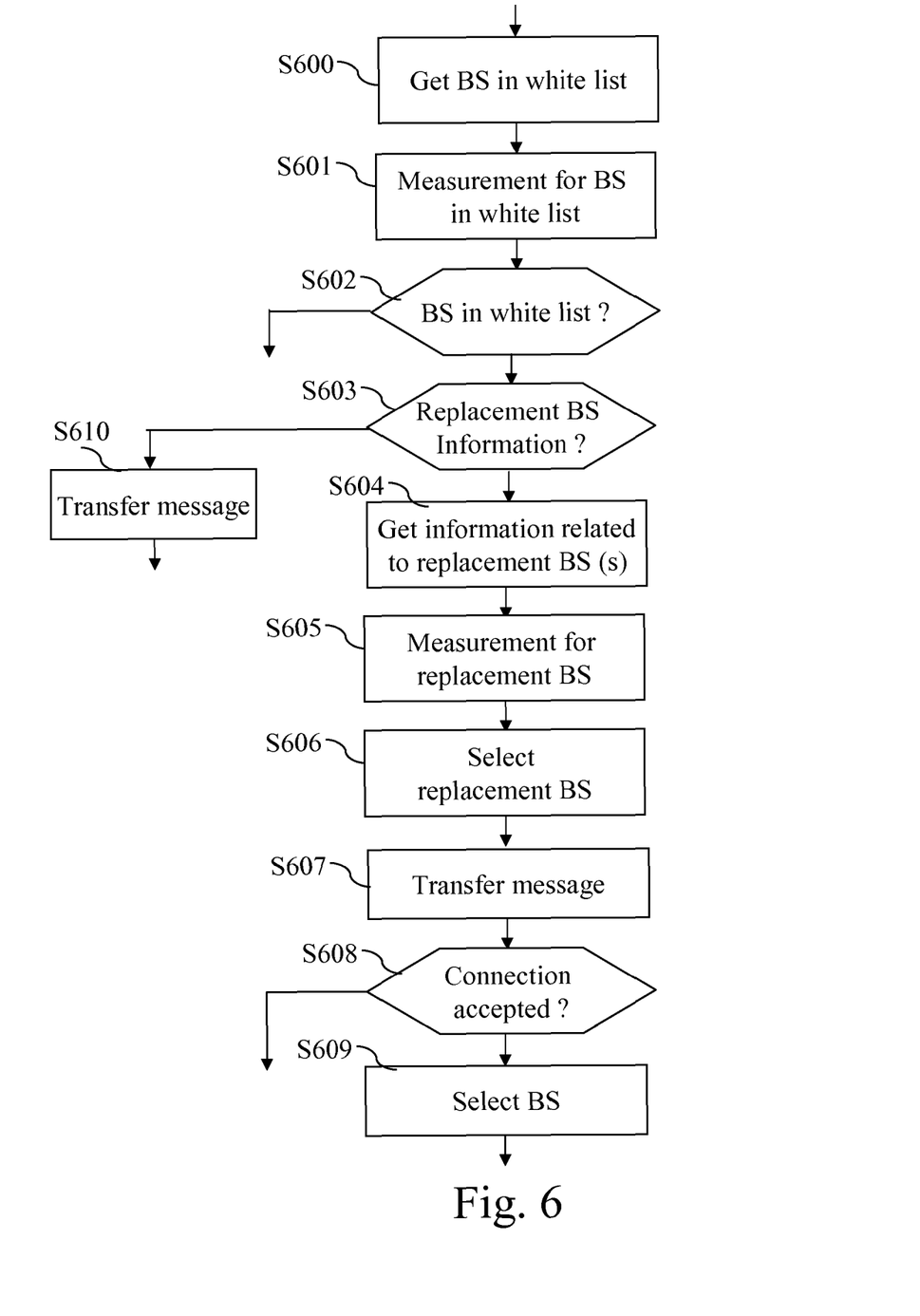
FIG. 6 discloses an example of an algorithm executed by a mobile terminal in order to attempt to access the wireless cellular telecommunication network according to a first mode of realisation of the present invention.

The mobile terminal MT has, for example, an architecture based on components connected together by a bus 201 and a processor 200 controlled by the programs as disclosed in FIG. 6.

The bus 201 links the processor 200 to a read only memory ROM 202, a random access memory RAM 203 and a wireless interface 205.

The memory 203 contains registers intended to receive variables and the instructions of the programs as disclosed in FIG. 6.

The memory 203 memorises the white list of the mobile terminal MT according to the present invention.

The processor 200 controls the operation of the wireless interface 205.

The read only memory 202 contains instructions of the program as disclosed in FIG. 6, which are transferred, when the mobile terminal MT is powered on, to the random access memory 203.

The wireless interface 205 enables the mobile terminal MT to transfer and/or receive signals or messages to/from the base stations BS.

The wireless interface 205 comprises means for transferring signals to the base stations and for measuring or detecting the signals transferred by the base stations BS identified in the white list of the mobile terminal MT.

The mobile terminal MT may comprise a Global Navigation Satellite System module like a Global Positioning System module not shown in FIG. 2.

Figure 3:
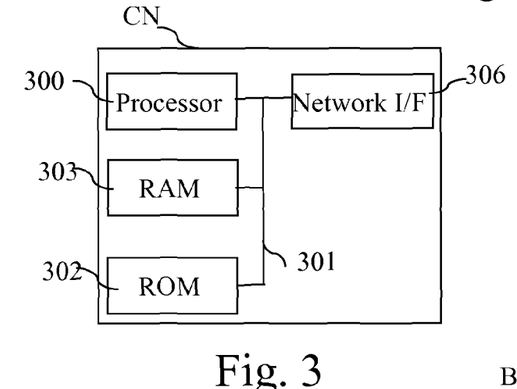
FIG. 3 is a diagram representing the architecture of a core network device in which the present invention is implemented.

FIG. 3 is a diagram representing the architecture of a core network device in which the present invention is implemented.

Figures 5A, 5B, 5C:
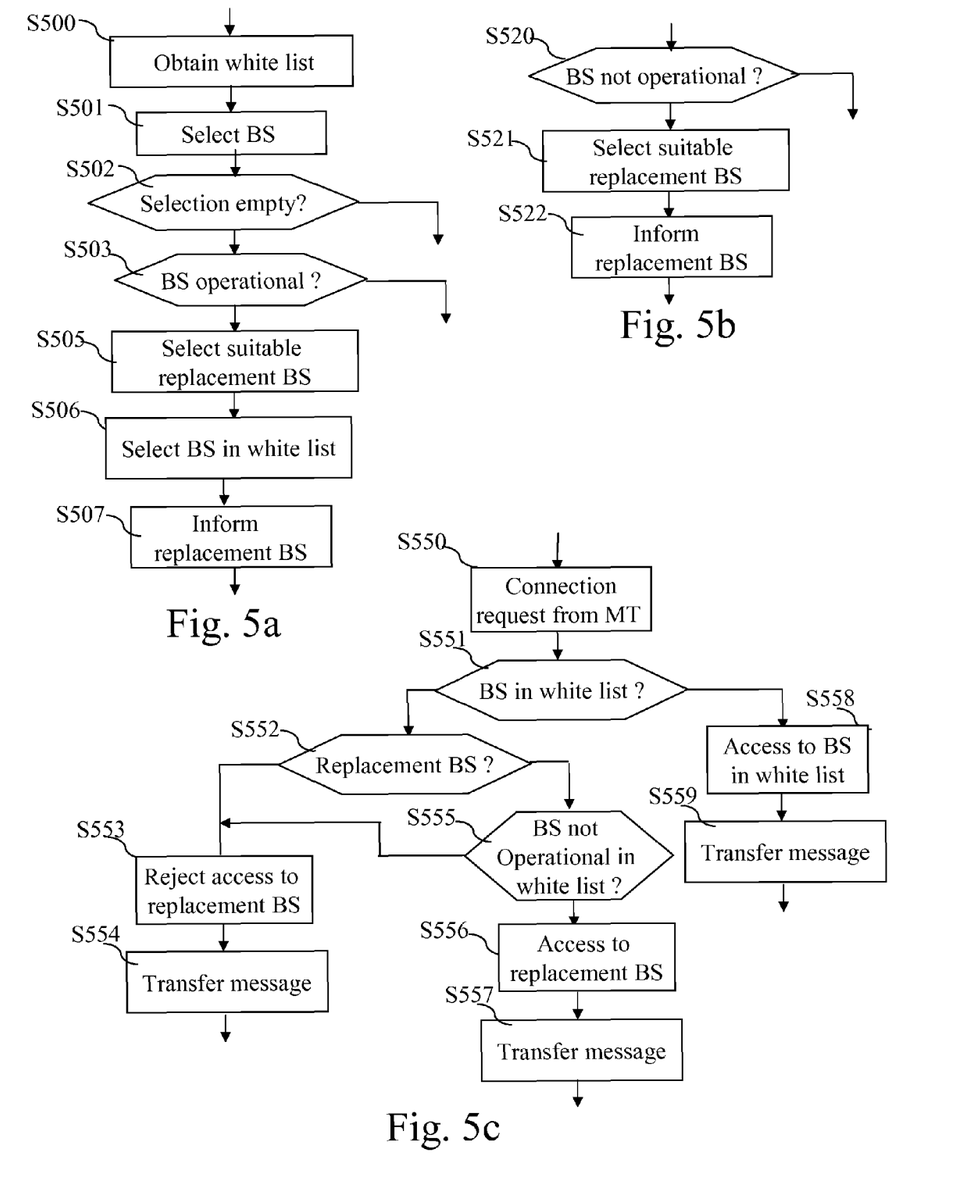
FIG. 5a discloses an example of an algorithm executed by a core network device according to the present invention for each mobile terminal located in the area managed by the core network device.
FIG. 5b discloses an example of an algorithm executed by a core network device according to a variant of realisation of the present invention for at least a part of the base stations BS located in the area managed by the core network device.
FIG. 5c discloses an example of an algorithm executed by a core network device according to the present invention when the core network device receives a request for connection to the wireless cellular telecommunication network by a mobile terminal located in the area managed by the core network device.

The core network device CN has, for example, an architecture based on components connected together by a bus 301 and a processor 300 controlled by the programs as disclosed in FIG. 5.

The bus 301 links the processor 300 to a read only memory ROM 302, a random access memory RAM 303 and a network interface 306.

The memory 303 contains registers intended to receive variables and the instructions of the programs related to the algorithms as disclosed in FIG. 5.

The memory 303 may comprise the white list of each mobile terminal MT1 and MT2.

The memory 303 may comprise representative of the neighbouring conditions of the base stations BS.

The processor 300 controls the operation of the network interface 306.

The read only memory 302 contains instructions of the programs related to the algorithms as disclosed in FIG. 5, which are transferred, when the core network device CN is powered on, to the random access memory 303.

The core network device CN may be connected to a telecommunication network not shown in FIG. 1 through the network interface 306. For example, the network interface 306 is a DSL (Digital Subscriber Line) modem, or an ISDN (Integrated Services Digital Network) interface, etc. Through the network interface 306, the core network device CN may transfer or receive messages to/from at least one base station BS.

Messages are transferred or received through links S1 established on the telecommunication network between the core network device CN and the base stations BS.

Figure 4:
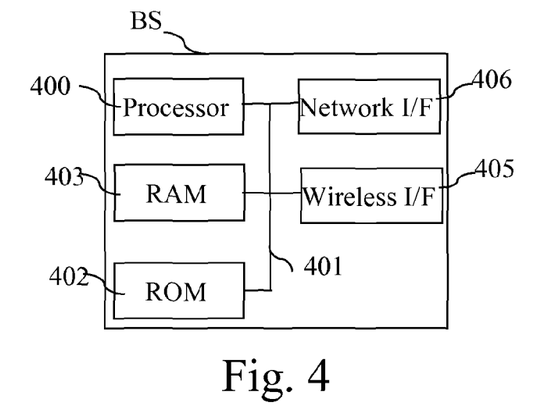
FIG. 4 is a diagram representing the architecture of a base station in which the present invention is implemented.

FIG. 4 is a diagram representing the architecture of a base station in which the present invention is implemented.

Figure 7:
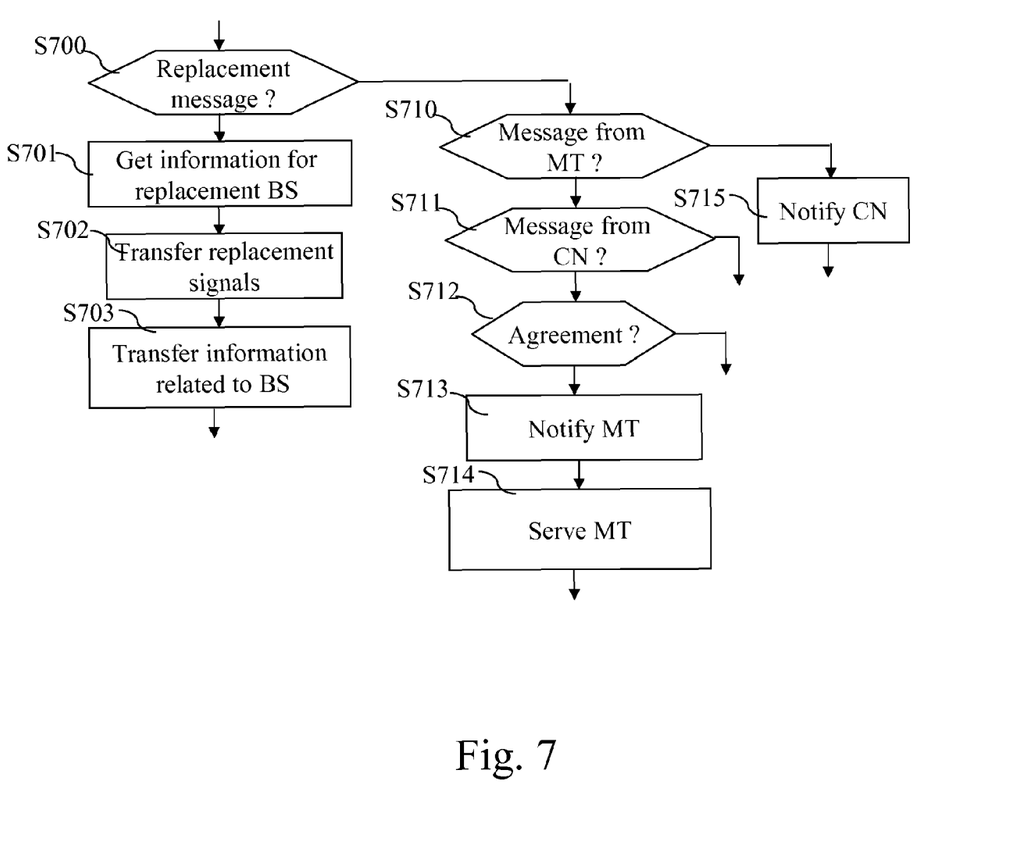
FIG. 7 discloses an example of an algorithm executed by a base station according to the present invention.

The base station BS has, for example, an architecture based on components connected together by a bus 401 and a processor 400 controlled by the program as disclosed in FIG. 7.

The bus 401 links the processor 400 to a read only memory ROM 402, a random access memory RAM 403, a wireless interface 405 and a network interface 406.

The memory 403 contains registers intended to receive variables and the instructions of the program related to the algorithm as disclosed in FIG. 7.

The memory 403 may comprise information identifying each base station BS which is identified in the white list of each mobile terminal MT.

The memory 403 may comprise representative of the neighbouring conditions of the base stations BS.

The processor 400 controls the operation of the network interface 406 and of the wireless interface 405.

The read only memory 402 contains instructions of the program related to the algorithm as disclosed in FIG. 7, which are transferred, when the base station BS is powered on, to the random access memory 403.

The base station BS may be connected to a telecommunication network through the network interface 406. For example, the network interface 406 is a DSL (Digital Subscriber Line) modem, or an ISDN (Integrated Services Digital Network) interface, etc. Through the network interface 406, the base station BS may transfer messages to the core network device CN or to other base stations BS or may receive messages from other base stations BS or from the core network device CN.

The messages are transferred through links S1 or X2 established on the telecommunication network between the base station BS and the core network device CN or between the base station BS and other base stations BS.

The wireless interface 405 and the network interface 406 are the resources of the base station BS used by a mobile terminal MT in order to access to the wireless cellular telecommunication network when the mobile terminal MT establishes or receives a communication with a remote telecommunication device.

The wireless interface 405 comprises means for transferring signals identifying the base station BS and/or identifying another base station BS according to the present invention and means for receiving signals transferred to the base station BS.

FIG. 5a discloses an example of an algorithm executed by a core network device for each mobile terminal located in the area managed by the core network device.

More precisely, the present algorithm is executed by the processor 300 of the core network device CN.

At step S500, the processor 300 obtains the white list of a mobile terminal MT, for example the white list of the mobile terminal MT1.

The processor 300 gets the white list of the mobile terminal MT1 using, for example, the identifier of the mobile terminal MT1 as a key in a database comprising the white list of each mobile terminal MT1.

At next step S501, the processor 300 selects a list of base stations BS which is a subset of the white list of the mobile terminal MT1.

The processor 300 selects the base station or base stations BS by selecting among the at least one base station BS identified in the white list of the mobile terminal MT1, the base station or base stations BS which is or are located in the vicinity of the mobile terminal MT1. In that case, the processor 300 selects the base station BS1.

At next step S502, the processor 300 checks if the list of base stations BS built at step S501 is empty.

If the list built at step S501 is empty, the processor 300 interrupts the present algorithm, selects another mobile terminal MT, for example the mobile terminal MT2, and executes the present algorithm for the new selected mobile terminal MT2.

Otherwise, the processor 300 moves to step S503.

At step S503, the processor 300 checks if at least one base station BS in the list of base stations BS built at step S501 is operational. For example, the processor 300 checks if the base station BS1 is operational.

The processor 300 may check if the base station or base stations BS in the list of base stations BS built at step S501 is or are operational by checking if the base station or base stations BS responds or respond to a message or signal transferred by the core network device CN.

The processor 300 may check if the base station or base stations BS in the list of base stations BS built at step S501 is or are operational by checking if the link S1 between that base station or these base stations BS and the core network device CN is operational.

If at least one base station BS in the list of base stations BS built at step S501 is operational, the processor 300 interrupts the present algorithm, selects another mobile terminal MT2 and executes the present algorithm for the new selected mobile terminal MT2.

If none of the base stations BS in the list of base stations BS built at step S501 is operational, the processor 300 moves to step S505.

For example, the base station BS1 is not operational.

At step S505, the processor 300 selects at least one suitable base station BS which may replace the base station BS identified in the white list which is located in the vicinity of the mobile terminal MT1 and which is not operational.

The processor 300 selects, among the base stations BS which are neighbour of the base stations BS of the list formed at step S501, the base station or base stations BS which transfers or transfer the signals which may be received by the mobile terminal MT1 with the highest power strength among the signals transferred by other base stations BS and/or selects, among the base stations BS which are neighbour of the base stations BS of the list formed at step S501, the base station or base stations BS which has or have the lowest working load and/or selects, among the base stations BS which are neighbour of the base stations BS of the list formed at step S501, the base station or base stations BS which transfers or transfer the signals which may be received by the mobile terminal MT with the highest quality.

At next step S506, the processor 300 selects among the base stations BS of the white list of the mobile terminal MT1, the base station or base stations BS which transfers or transfer signals identifying the base station BS which are as orthogonal as possible to the ones of the base station or base stations BS selected at step S505.

At next step S507, the processor 300 commands the transfer of a message to the base station or base stations BS selected at step S505 notifying the base station BS that the base station BS has to transfer signals identifying another base station, i.e. one of the base stations BS selected at step S506. The message may also identify each replacement base station BS, i.e. each base station BS selected at step S505, or some replacement base stations BS, i.e., a subset of the base stations BS selected at step S505.

The information identifying the base station BS and other information needed by the mobile terminal MT1 in order to be able to decode a message sent by the base station BS selected at step S506 may also be transferred by the core network device CN to the base station selected at step S505.

For example, the base station BS2 may be selected at step S505 and the base station BS selected at step S506 is the base station BS1 which is not operational.

For example, the base station BS2 may be selected at step S505 and the base station BS selected at step S506 is the base station BS4 that transfers signals identifying the base station BS4 which are the most orthogonal to the one of the base station BS2.

For example, the base stations BS2 and BS3 may be selected at step S505 and the base stations BS selected at step S506 are the base stations BS1 and BS4. In that case, the base station BS2 may transfer signals identifying the base station BS1 and the base station BS2 may transfer signals identifying the base station BS4.

Using signals identifying plural first base stations, signals identifying each first base station being sent by a different second base station, enables the use of signals which have better cross-correlation properties. Thus, the amount of interference between signals is reduced.

After that, the processor 300 interrupts the present algorithm, selects another mobile terminal MT and executes the present algorithm for the new selected mobile terminal MT.

FIG. 5b discloses an example of an algorithm executed by a core network device according to a variant of realisation of the present invention for at least a part of the base stations BS located in the area managed by the core network device.

More precisely the present algorithm is executed by the processor 300 of the core network device CN.

At step S520, the processor 300 checks if there is one base station BS located in the area the core network device CN manages which is not operational.

If no base station BS is not operational, the processor returns to step S520.

If one base station BS is not operational, the processor 300 moves to step S521.

For example, the base station BS1 is not operational.

At step S521, the processor 300 selects at least one suitable base station BS which may replace the base station BS1 which is not operational.

For example, the processor 300 selects one suitable base station BS which may replace the base station BS1 which is not operational for the mobile terminal MT or mobile terminal MTs of which the base station BS1 is identified in its or their white list.

For example, the processor 300 selects for each mobile terminal MT of which the base station BS1 is identified in its white list one suitable base station BS which may replace the base station BS1. The selected base stations BS may be different for different mobile terminals MT.

At next step S522, the processor 300 commands the transfer of a message to the base station or base stations BS selected at step S521 notifying the base station BS that the base station BS has to transfer signals identifying another base station, i.e. the base station BS1.

After that, the processor 300 returns to step S520.

It has to be noted here that, in a variant, the present algorithm is executed for each base station BS without considering if the base station BS is operational or not.

FIG. 5c discloses an example of an algorithm executed by a core network device according to the present invention when the core network device receives a request for connection to the wireless cellular telecommunication network by a mobile terminal located in the area managed by the core network device.

The present algorithm is executed in parallel with the algorithm of the FIG. 5a or 5b each time a message representative of a connection request is received from a mobile terminal MT through a base station BS.

More precisely, the present algorithm is executed by the processor 300 of the core network device CN.

At step S550, a message representative of a connection request is received from a mobile terminal MT through a base station BS.

For example, the message representative of a connection request is received from the mobile terminal MT1.

A next step S551, the processor 300 checks if the base station BS through which the message is received is identified in the white list of the mobile terminal MT which transferred the message received at step S550.

If the base station BS through which the message is received is identified in the white list of the mobile terminal MT which transferred the message received at step S550, the processor 300 moves to step S558. Otherwise, the processor 300 moves to step S552.

If the base station BS through which the message is received is the base station BS1 identified in the white list of the mobile terminal MT1, the processor 300 moves to step S558.

It has to be noted here that, according to a variant of realisation, the mobile MT1 may insert in its white list information identifying a replacement base station BS. In that case, if the base station BS through which the message is received is the base station BS2 identified in the white list of the mobile terminal MT1, the processor 300 moves to step S558.

If the base station BS through which the message is received is the base station BS2 not identified in the white list of the mobile terminal MT1, the processor 300 moves to step S552.

At step S558 the processor 300 gives access right to the mobile terminal MT to use the resources of the base station BS in order to access to the wireless cellular telecommunication network.

At next step S559, the processor 300 commands the transfer of an access grant message to the mobile terminal MT through the base station BS.

The mobile terminal MT can, through the base station BS, establish or receive a communication with a remote telecommunication device and/or can download data.

After that, the processor 300 interrupts the present algorithm.

At step S552, the processor 300 checks if the base station BS through which the message is received is a base station BS selected at step S505 of the algorithm of the FIG. 5a for the mobile terminal MT1 which transferred the message received at step S550 or is a replacement BS as selected at step S521 of the FIG. 5b.

If the base station BS through which the message is received is a base station BS selected at step S505 of the algorithm of the FIG. 5a for the mobile terminal MT which transferred the message received at step S550 or is a replacement BS as selected at step S521 of the FIG. 5b, the processor 300 moves to step S555. Otherwise, the processor 300 moves to step S553.

At step S555, the processor 300 checks if the base station BS1 identified in the white list of the mobile terminal MT1 and that should transfer signals to the mobile terminal MT1 is not operational or checks if the base station BS1 that the base station BS2 replaces is not operational.

If the base station BS1 identified in the white list of the mobile terminal MT1 and that the base station BS2 replaces is not operational, the processor 300 moves to step S556. Otherwise, the processor 300 moves to step S553.

At step S556 the processor 300 gives access right to the mobile terminal MT to use the resources of the base station BS2 in order to access the wireless cellular telecommunication network.

At next step S557, the processor 300 commands the transfer of an access grant message to the mobile terminal MT through the base station BS.

The mobile terminal MT1 can, through the base station BS2, establish or receive a communication with a remote telecommunication device and/or can download data.

After that, the processor 300 interrupts the present algorithm.

At step S553, the processor 300 rejects the right to access, by the mobile terminal MT, the wireless cellular telecommunication network through the base station BS through which the message received at step S550 has been received.

At next step S554, the processor 300 commands the transfer of a message to the base station BS through which the message received at step S550 has been received.

The message is representative of a rejection to give right to the mobile terminal MT to use the resources of the base station BS in order to access the wireless cellular telecommunication network.

After that, the processor 300 interrupts the present algorithm.

FIG. 6 discloses an example of an algorithm executed by a mobile terminal in order to attempt to access the wireless cellular telecommunication network according to a first mode of realisation of the present invention.

More precisely, the present algorithm is executed by the processor 200 of the mobile terminal MT.

At step S600, the processor 200 gets the white list of the mobile terminal MT. The white list is for example memorized in the RAM memory 203.

The white list comprises information identifying at least one base station BS and/or comprises information enabling the mobile terminal MT to synchronize on signals transferred by the at least one base station BS.

At next step S601, the processor 200 commands the wireless interface 205 to proceed to some measurements of signals identifying at least one base station BS identified in the white list.

At next step S602, the processor 200 checks if the signals identifying at least one base station BS identified in the white list are upper than a predetermined threshold.

If the white list comprises a single base station BS, the wireless interface 205 checks if the signals identifying that base station BS are received at a power level upper than a given value.

If plural base stations BS are identified in the white list, the wireless interface 205 measures each signal identifying each base stations BS identified in the white list and measures signals transferred by other base stations BS which are neighbour of the base stations BS comprised in the white list. The mobile terminal MT, by measuring the signals transferred by neighbour base stations BS of a base station BS identified in the white list, is able to determine its location and which base station BS identified in the white list the mobile terminal MT is close to. By doing this, the mobile terminal MT is also able to determine which of other base stations BS which are neighbour of the base stations BS comprised in the white list the mobile terminal MT is close to.

In a variant, if plural base stations BS are identified in the white list, the wireless interface 205 can also check which of the signals identifying each base station BS are received with maximum power level and if this power level is upper than a given value.

In a variant, the wireless interface 205 measures the signals identifying the base stations BS comprised in the white list which are the closest from the mobile terminal MT location, the mobile terminal MT location being determined for example by geo-location techniques as GNSS or radio finger print and the base station BS location being broadcasted by the core network.

A radio fingerprint characterises the radio signals received in a given location. A radio fingerprint may be a list of base station identifiers or the result of measurements on signals received at a location. By comparing a fingerprint with fingerprints memorized in a database, it is possible to determine the location of the mobile terminal MT.

If the signals identifying a base station BS identified in the white list are upper than the predetermined threshold, the processor 200 moves to step S603. Otherwise, the processor 200 interrupts the present algorithm or returns to step S601.

At step S603, the processor 200 checks if the signals identifying the base station BS identified in the white list comprise information indicating that the mobile terminal MT has to monitor signal or synchronise on signals transferred by at least one base station BS which is not identified in the white list of the mobile terminal MT.

If the signals identifying the base station BS identified in the white list comprise information indicating that the mobile terminal MT has to monitor signals or synchronise on signals transferred by at least one base station BS which is not identified in the white list of the mobile terminal MT, it means that at least one base station BS identified in the white list is not operational and that another base station BS not identified in the white list is currently transferring the signals identifying the base station BS which is not operational.

If the signals identifying the base station BS identified in the white list comprise information indicating that the mobile terminal MT has to monitor signals or synchronise on signals transferred by at least one base station BS which is not identified in the white list of the mobile terminal MT, the processor 200 moves to step S604. Otherwise, it means the signals identifying the base station BS1 are effectively transferred by the base station BS1. The processor 200 moves to step S610.

At step S610, the processor 200 commands the transfer of a message to the base station BS1.

The mobile terminal MT1 can, through the identified base station BS1, establish or receive a communication with a remote telecommunication device and/or can download data.

At step S604, the processor 200 gets information identifying at least one base station BS which is not identified in the white list of the mobile terminal MT. That at least one base station BS is the replacement base station BS.

Information identifying the base station BS may identify uniquely the base station BS among all the base stations BS of the wireless cellular telecommunication network or may identify uniquely the base station BS among a limited number of base stations BS of the wireless cellular telecommunication network, for example the base stations BS located within a given area.

The information identifying one base station BS enables the mobile terminal MT to recognize signals transferred by the base station BS and/or enables the synchronisation of the mobile terminal MT on the signals transferred by the base station BS. The information identifying a base station BS may also be, for example, reference signals used for estimation of the channel between the base station BS and the mobile terminal MT.

For example, the base station BS1 is not operational.

The base station BS2 may broadcast signals identifying the base station BS1 comprising information indicating that the mobile terminals MT have to monitor signals or synchronise on signals transferred by the base station BS2 and/or the base station BS3. In such case, as the base station BS1 is identified in the white list of the mobile terminals MT1 and MT2, both are able to perform measurement at step S601 and to perform the check of the step S603.

The base station BS2 may broadcast signals identifying the base station BS4 comprising information indicating that the mobile terminals MT have to monitor signals or synchronise on signals transferred by the base station BS2 and/or the base station BS3. In such case, as the base station BS4 is identified only in the white list of the mobile terminal MT1, only the mobile terminal MT1 is able to perform measurement at step S601 and to perform the check of the step S603.

At next step S605, the processor 200 commands to proceed to some measurement on the signals identifying the base stations identified at step S604.

At next step S606, the processor 200 selects one of the identified base stations BS. For example, the processor 200 selects among the identified base stations BS, the base station BS which transfers the signals which are received by the mobile terminal MT1 with the highest power strength among the signals transferred by the identified base stations BS and/or selects, among identified base stations BS, the base station BS which has the lowest working load and/or selects, among the identified base stations BS, the base station BS which transfers the signals which may be received by the mobile terminal MT with the highest quality.

It has to be noted here that the identified and selected base station BS2 as a replacement base station BS is preferably identified in the white list of the mobile terminal MT1, for example, for a limited time duration.

It has to be noted here that when the signals identifying the base station BS1 identified in the white list comprise information indicating that the mobile terminal MT1 has to monitor signals or synchronise on signals transferred by a single base station BS2 which is not identified in the white list of the mobile terminal MT, the processor 200 moves from step S604 to step S607.

At next step S607, the processor 200 commands the transfer of a message to the replacement base station BS.

For example, the processor 200 commands the transfer of a message to the identified base station BS2.

The message is representative of a request to get the rights to use the resource of the base station BS not identified in the white list in order to get access to the wireless cellular telecommunication network.

At next step S608, the processor 200 checks if, in response to the message transferred at step S607, a message is received allowing the use of the resource of the base station BS2 by the mobile terminal MT1 in order to access to the wireless cellular telecommunication network.

If a message is received allowing the mobile terminal MT1 to use the resource of the base station BS2 in order to access to the wireless cellular telecommunication network, the processor 200 moves to step S609. Otherwise, the processor 200 interrupts the present algorithm or returns at step S601.

At step S609, the base station BS2 is selected. The selected base station BS2 is the base station BS2 through which the mobile terminal MT1 can access to the wireless cellular telecommunication network.

The mobile terminal MT1 can, through the base station BS2, establish or receive a communication with a remote telecommunication device and/or can download data.

After that, the processor 200 interrupts the present algorithm.

FIG. 7 discloses an example of an algorithm executed by a base station according to the present invention.

More precisely, the present algorithm is executed by the processor 400 of each base station BS.

For example, the present algorithm is executed by the processor 400 of the base station BS2.

At step S700, the processor 400 checks if a message notifying the base station BS2 that the base station BS2 has to transfer signals identifying another base station is received.

That message is the one transferred by the core network device CN at step S507 of the algorithm of the FIG. 5*a* or at step S522 of the FIG. 5*b*.

If a message notifying the base station BS2 that the base station BS2 has to transfer signals identifying another base station is received, the processor 400 moves to step S701. Otherwise, the processor 400 moves to step S710.

At step S701, the processor 400 gets information identifying the other base station BS.

The other base station BS may be the base station BS that the base station BS2 has to replace when a base station BS is not operational, or a base station BS which is identified in the white list of the mobile terminal MT which should connect to the base station BS which BS2 has to replace.

The information identifying the base station BS, for example the base station BS1 that the base station BS2 has to replace, may be comprised in the message received at step S700 or memorized in the RAM memory 403.

The information identifying the base station BS1 may identify uniquely the base station BS1 among all the base stations BS of the wireless cellular telecommunication network or may identify uniquely the base station BS1 among a limited number of base stations BS of the wireless cellular telecommunication network, for example the base stations BS located within a given area.

The information identifying the base station BS1 identified in the white list of the mobile terminal MT enables the mobile terminal MT to recognize signals transferred by the base station BS1 and/or enables the synchronisation of the mobile terminal MT on the signals transferred by the base station BS1. The information identifying the base station BS1 identified in the white list of the mobile terminal MT may also be, for example, reference signals used for the estimation of the channel between the base station BS1 and the mobile terminal MT.

At next step S702, the processor 400 commands the wireless interface 405 to transfer signals identifying a base station BS1 identified in the white list of the mobile terminal MT.

The signals identifying the base station BS1 identified in the white list of the mobile terminal MT may be synchronization signals corresponding to the cell identifier of the base station BS1 identified in the white list of the mobile terminal MT and system information.

The signals identifying the base station BS identified in the white list of the mobile terminal MT may be transferred on the same radio resources as the signals identifying the base station BS2.

At next step S703, the processor 400 commands the wireless interface 405 to transfer with the signals identifying the base station BS1 identified in the white list information indicating that the mobile terminal MT has to monitor signal or synchronise on signals identifying the base station BS2 and/or at least one other base station BS.

It has to be noted here that the signals identifying the base station BS1 identified in the white list and the signals identifying the base station BS2 are transferred in a synchronous manner.

After that the processor 400 returns to step S700.

At step S710, the processor 400 checks if a message is received from a mobile terminal MT.

If a message is received from a mobile terminal MT, the processor 400 moves to step S715. Otherwise, the processor 400 moves to step S711.

At step S715, the processor 400 commands the transfer of the received message to the core network device CN.

After that the processor 400 returns to step S700.

At step S711, the processor 400 checks if a message is received from the core network device CN.

If a message is received from the core network device CN, the processor 400 moves to step S712. Otherwise, the processor 400 returns to step S700.

At step S712, the processor 400 checks if the message allows the mobile terminal MT to access the wireless cellular telecommunication network through the base station BS2.

That message is as the one transferred by the core network device CN at step S557 of the FIG. 5c.

If the message allows the mobile terminal MT to access the wireless cellular telecommunication network through the base station BS, the processor 400 moves to step S713. Otherwise, if a message is received from the core network device CN refusing that the mobile terminal MT accesses the wireless cellular telecommunication network through the base station BS2, the processor 400 returns to step S700.

At step S713, the processor 400 transfers a message to the mobile terminal MT notifying it that it is allowed to access the wireless cellular telecommunication network through the base station BS2.

At next step S714, the mobile terminal MT can, through the base station BS2, establish or receive or continue a communication with a remote telecommunication device and/or can download data.

After that the processor 400 returns to step S700.

Naturally, many modifications can be made to the embodiments of the invention described above without departing from the scope of the present invention.

The invention claimed is:

1. A method for enabling a mobile terminal to access a wireless cellular telecommunication network comprising plural base stations and a core network device, the mobile terminal being allowed to access the wireless cellular telecommunication network through at least one first base station, the mobile terminal memorizing a list comprising information enabling the identification of signals transferred by each first base station, the mobile terminal not memorizing information enabling the identification of signals transferred by second base stations, the method being executed by one second base station and comprising:
   receiving, from the core network device, a message requesting the second base station to transfer signals corresponding to a first base station;
   transferring the signals corresponding to the first base station; and
   transferring in the signals corresponding to the first base station, information enabling identification by the mobile terminal of other signals corresponding to the second base station or at least one other second base station.

2. The method according to claim 1, wherein the method further comprises, executing by the core network device:
   determining if the first base station that should transfer the signals to the mobile terminal is not operational;
   transferring a message requesting the second base station to transfer signals corresponding to the first base station of which information enabling the identification of signals transferred by the first base station is comprised in the list if the first base station that should transfer the signals to the mobile terminal is not operational; and
   allowing the mobile terminal to access the wireless cellular telecommunication network through the second base station signals corresponding to the first base station of which information enabling the identification of signals transferred by the first base station is comprised in the list.

3. The method according to claim 2, wherein information enabling the identification by the mobile terminal of other signals transferred by at least one other second base station are received from the core network device or memorized by the second base station.

4. The method according to claim 2, wherein the signals corresponding to the first base station are the signals corresponding to the first base station which is not operational.

5. The method according to claim 2, wherein the signals corresponding to the first base station are the signals corresponding to one first base station which is different from the base station which is not operational.

6. A method for enabling a mobile terminal to access a wireless cellular telecommunication network comprising plural base stations and a core network device, the mobile terminal being allowed to access the wireless cellular telecommunication network through at least one first base station, the mobile terminal memorizing a list comprising information enabling the identification of signals transferred by each first base station, the mobile terminal not memorizing information enabling the identification of signals transferred by second base stations, wherein the method is executed by the mobile terminal and comprising:

receiving signals corresponding to one first base station from one second base station;

checking if signals corresponding to the first base station comprise information enabling identification of other signals by the mobile terminal; and transferring a message to one second base station if information enabling the identification by the mobile terminal of other signals is received, the message requesting to access the wireless cellular telecommunication network through the second base station.

7. The method according to claim 6, wherein the information enabling the identification by the mobile terminal of other signals is transferred by the second base station to which the message is transferred.

8. The method according to claim 6, wherein the information enabling the identification by the mobile terminal of other signals is transferred by another second base station which is different from the second base station to which the message is transferred.

9. The method according to claim 6, further comprising:
memorizing the information enabling the identification by the mobile terminal of other signals.

10. The method according to claim 9, wherein the information enabling the identification by the mobile terminal of other signals are memorized for a limited period of time.

11. The method according to claim 6, wherein prior to transferring a message to one second base station, the method further comprises receiving other signals identifying one second base station.

12. A device for enabling a mobile terminal to access a wireless cellular telecommunication network comprising plural base stations and a core network device, the mobile terminal being allowed to access the wireless cellular telecommunication network through at least one first base station, the mobile terminal memorizing a list comprising information enabling the identification of signals transferred by each first base station, the mobile terminal not memorizing information enabling the identification of signals transferred by second base stations, wherein the device for enabling a mobile terminal to access a wireless cellular telecommunication network is included in a second base station and comprises:

a receiver configured to receive, from the core network device, a message requesting the second base station to transfer signals corresponding to one first base station; and a transmitter configured to transfer signals corresponding to the first base station, the transmitter configured to transfer, in the signals corresponding to the first base station, information enabling identification by the mobile terminal of other signals transferred by the second base station or at least one other second base station.

13. A device for enabling a mobile terminal to access a wireless cellular telecommunication network comprising plural base stations and a core network device, the mobile terminal being allowed to access the wireless cellular telecommunication network through at least one first base station, the mobile terminal memorizing a list comprising information enabling the identification of signals transferred by each first base station, the mobile terminal not memorizing information enabling the identification of signals transferred by second base stations, wherein the device for enabling a mobile terminal to access to a wireless cellular telecommunication network is included in the mobile terminal and comprises:

a receiver configured to receive signals corresponding to one first base station from one second base station;

a checker configured to check if signals corresponding to the first base station comprise information enabling identification of other signals by the mobile terminal; and a transmitter configured to transfer a message to one second base station if information enabling the identification by the mobile terminal of other signals is received, the message requesting to access the wireless cellular telecommunication network through the second base station.

14. A non-transitory computer-readable storage medium storing thereon a computer program which can be directly loadable into a programmable device, comprising instructions or portions of code for implementing the method according to claim 1, when said computer program is executed on a programmable device.

15. A non-transitory computer-readable storage medium storing thereon a computer program which can be directly loadable into a programmable device, comprising instructions or portions of code for implementing the method according to claim 6, when said computer program is executed on a programmable device.

* * * * *